Nov. 14, 1933.  V. BENDIX ET AL  1,935,384
BRAKE
Filed Jan. 24, 1929   2 Sheets-Sheet 1

INVENTORS
Vincent Bendix
Ludger E. LaBrie
BY
ATTORNEY

Nov. 14, 1933. V. BENDIX ET AL 1,935,384
BRAKE
Filed Jan. 24, 1929 2 Sheets-Sheet 2

INVENTORS
Vincent Bendix
Ludger E. LaBrie
BY
Jn. W. McConkey
ATTORNEY

Patented Nov. 14, 1933

1,935,384

UNITED STATES PATENT OFFICE 1,935,384

BRAKE

Vincent Bendix, Chicago, Ill., and Ludger E. La Brie, South Bend, Ind., assignors to Bendix Brake Company, South Bend, Ind., a corporation of Illinois Application January 24, 1929. Serial No. 334,673

13 Claims. (Cl. 188—78)

This invention relates to brakes and is illustrated as embodied in an internal expanding brake for an automobile. An object of the invention is to provide a very powerful brake having a multiplied servo action secured by interconnecting a servo shoe forming part of the brake with the applying means for the brake. Thus the applying means acts not only on the friction means directly, but also indirectly through the servo shoe with a multiplied effect.

In one desirable arrangement the applying means, which may be in the form of levers or the like mounted on the servo shoe, is operated to force the servo shoe against the drum and is also operated directly to force the friction means of the brake against the drum. The servo shoe may act on the friction means either directly or through the applying means. The friction means of the brake is preferably of the type which has one part which anchors when the drum is turning in one direction and a different part which anchors when the drum is turning in the other direction.

Figure 1:
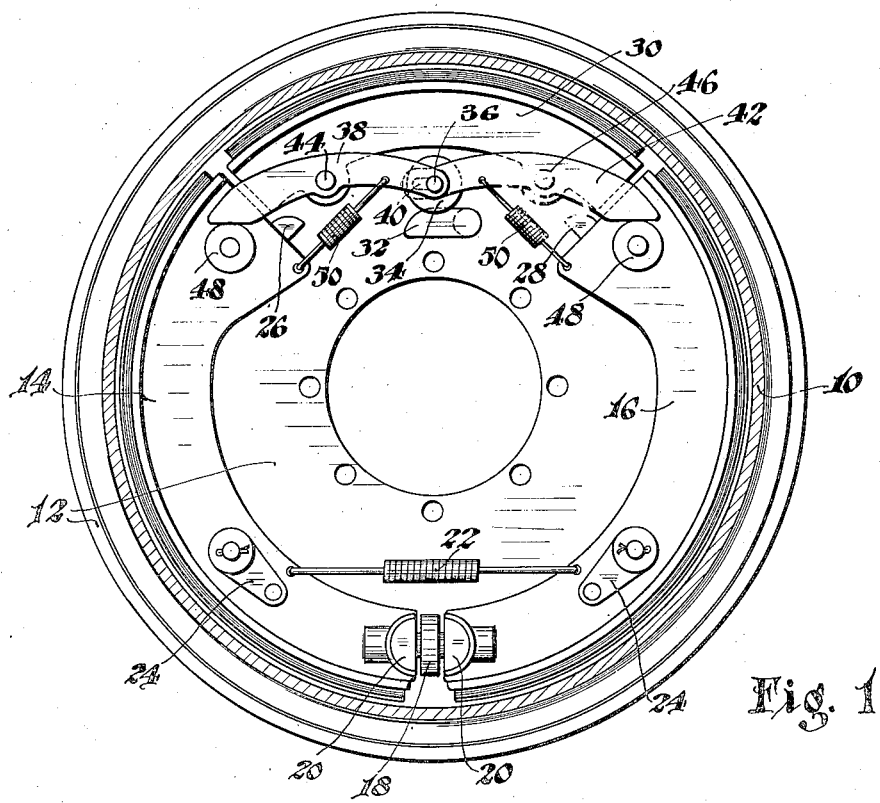

Various features of novelty relate to the mechanical arrangement of parts for carrying the invention into effect and several embodiments of which are shown in the accompanying drawings, in which:

Figure 1 is a vertical section through the brake just inside the head of the brake drum and showing the brakes shoes in side elevation with one form of applying means; and Figures 2, 3, 4, 5 and 6 are respectively figures corresponding to the upper part of Figure 1 and showing different forms of applying means for the brake.

The brake shown in Figure 1 includes a rotatable brake drum 10 arranged to be mounted on the wheel of an automobile and at the open side of which is a suitable support such as a backing plate 12 and within which is arranged the friction means of the brake. The friction means in Figure 1 is in the form of a pair of interchangeable rigid arcuate brake shoes 14 and 16 connected by a floating expansible joint shown as comprising a right and left threaded member 18 threaded into semi-cylindrical thrust parts 20 seated in sockets in the lower adjacent ends of the shoes 14 and 16. A spring 22 tensioned between the shoes holds the above-described joint together. Positioning devices 24 of any desired form, and forming no part of the present invention, may be provided for the shoes. The upper ends of the shoes, which are spaced some distance apart, are held in engagement with stationary abutments 26 and 28, in such a manner that when the drum is turning clockwise the shoe 14 anchors against the abutment 26 while when the drum is turning counterclockwise, shoe 16 anchors against abutment 28.

A rigid arcuate servo shoe 30 is arranged between the upper ends of the shoes 14 and 16 in such a manner that when the brake is applied it is moved by the brake drum into direct thrust engagement with the end of one or the other of the shoes 14 and 16 so that it adds its thrust to the power of the brake applying means. The applying means in this case is in the form of a device such as a cam 32 thrusting against a roller 34 or the like having a pintle 36 pivotally mounted in the end of one lever 38 and extending through a slot 40 in the end of another lever 42. The levers 38 and 42 have their inner ends adjacent each other as just described and are fulcrumed between their ends on pivots 44 and 46 carried by the servo shoe 30 while their outer ends are in the form of wedges engaging rollers 48 carried by the ends of the shoes 14 and 16. It will be seen that when the cam 32 is turned to apply the brake the levers 38 and 42 first fulcrum on the rollers 48 to bring the servo shoe 30 into engagement with the drum and that further turning of the cam 32 rocks both of these levers to urge the shoes 14 and 16 apart to add the applying force of the cam 32 directly to the servo thrust of the shoe 30. Return springs 50 may be tensioned between the shoes 14 and 16 respectively and the levers 38 and 42.

Figure 2:
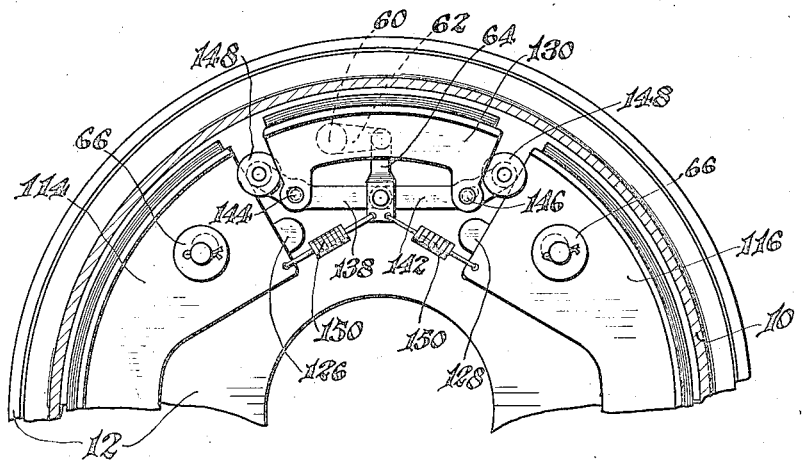
Figure 3:
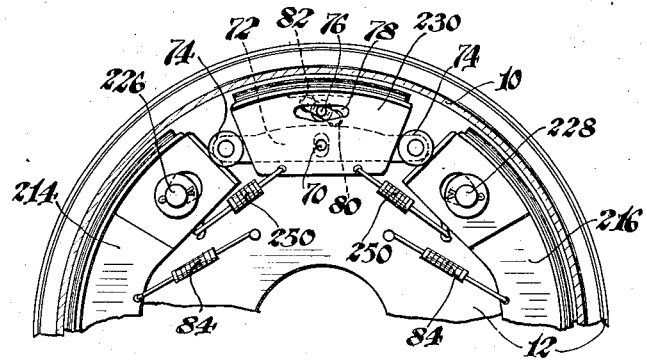

In the arrangement of Figure 2 shoes 114 and 116 are arranged to anchor as before on one or the other of two fixed abutments 126 or 128 and the servo shoe 130 which is arranged between the ends of these shoes has levers 138 and 142 fulcrumed thereon on pivots 144 and 146 carried by the servo shoe and extending through slots in the levers, the outer ends of the levers having rollers 148 in wedging thrust engagement with the ends of the shoes 114 and 116. In this case the brake operating shaft 60 has an arm 62 connected by a link 64 with the adjacent inner ends of the levers 138 and 142. The anchored ends of the shoes 114 and 116 are shown in this case provided with steady rests 66 which may be of any desired form. In the arrangement of Figure 3 the shoes 214 and 216 are slotted at their ends to embrace fixed anchor posts 226 and 228. In this case the servo shoe 230 has a transverse guide pin 70 passing through a slot in a rigid operating bar 72 extending along a chord of the brake drum and having at its opposite ends rollers 74 in wedging engagement with the ends of the shoes 214 and 216. In this case the brake applying shaft 76 extends through slots 78 in the sides of the shoe 230, which is channel-shaped in form, and is provided with an eccentrically mounted thrust roller 80 engaging the bar 72 and with another and oppositely eccentrically mounted thrust roller 82 engaging the inside of the channel of the shoe 230, so that the device thrusts at the same time against the servo shoe and against the bar 72. In this case the servo thrust of the shoe 230 is transmitted to one or the other of the two shoes 214 or 216 through the bar 72. By mounting shaft 76 in a floating bearing the thrust on the shoe 230 can be balanced against the thrust on the bar 72. In this arrangement the return springs 250 are tensioned between the servo shoe 230 and the shoes 214 and 216, respectively, and if desired auxiliary return springs 84 may be tensioned between the shoes 214 and 216 respectively and the backing plate 12.

Figure 4:
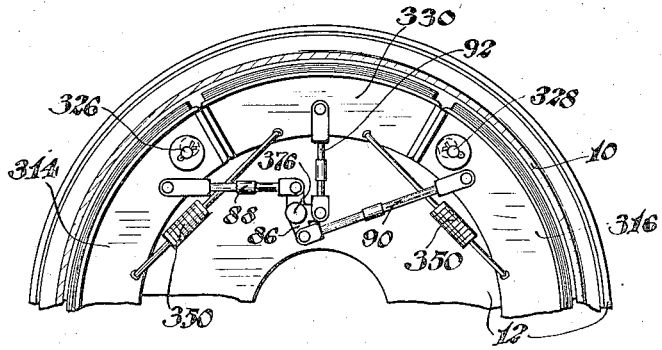

In the arrangement of Figure 4 the shoes 314 and 316 are slotted to embrace fixed anchor posts 326 and 328 the same as in Figure 3, and a servo shoe 330 is arranged between the ends of the shoes 314 and 316 but in direct thrust engagement therewith when the brake is released. The return springs 350 are in this case tensioned between the servo shoe 330 and the shoes 314 and 316 respectively. In this case the applying means includes an operating shaft 376, which carries a three-arm lever 86 connected by adjustable links 88 and 90 to the ends of the shoes 314 and 316 and by an adjustable link 92 to the servo shoe 330. Thus the turning of the shaft 376 forces the shoes 314 and 316 apart and also forces the servo shoe 330 outwardly against the drum where it turns with the drum to act against one or the other of the shoes 314 or 316.

Figure 5:
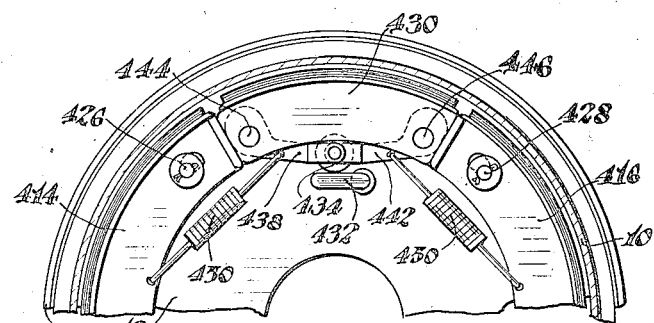

In the arrangement of Figure 5 the shoes 414 and 416 are slotted as before to embrace fixed anchor pivots 426 and 428 and the servo shoe 430 has fulcrumed thereon by means of pivots 444 and 446 a pair of levers 438 and 442 having their outer ends in the form of cams engaging the ends of the shoes 414 and 416 and having a roller 434 jointly carried by their inner ends in operative engagement with a cam 432. In this case the return springs 450 are tensioned between the levers 438 and 442 respectively and the shoes 414 and 416.

Figure 6:
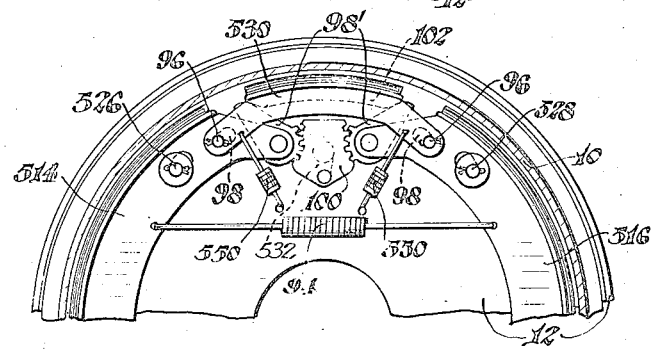

In Figure 6 the shoes 514 and 516, which may be connected by a return spring 94, are slotted to anchor on the fixed posts 526 and 528 and have a servo shoe 530 having its opposite ends pairs of arms straddling the ends of the shoes 514 and 516 and carrying transverse pins 96 extending through slots 98 in the shoes. Thus when the servo shoe turns with the drum it thrusts through one or the other of the pins 96 against one or the other of the shoes 514 or 516.

The ends of the shoes 514 and 516 have pivotally mounted thereon eccentric thrust members 98' having rack teeth meshing with teeth formed on the sides of an operating member 100 and having their upper ends in wedging engagement with the ends of a thrust plate 102 fastened in the channel of the servo shoe 530. The member 100 is pivotally connected to an operating crank 532. By turning the crank the operating member is rocked to apply the shoes and simultaneously therewith one of the levers 98' is moved by member 100 to engage the servo shoe with the drum, the other lever 98' moving away from the servo shoe. Because of the floating characteristic of the member 100, the wiping action of the drum balances the action of the levers 98' against the servo shoe. In this case the return springs 550 are shown tensioned between the opposite ends of shoe 530 and the backing plate 12 and act on the shoes 514 and 516 through the pins 96.

While several illustrative embodiments have been described in detail, it is not my intention to limit the scope of the invention to those particular embodiments or otherwise than by the terms of the appended claims.

We claim:

1. A brake comprising, in combination, a drum, friction means having one end which anchors when the drum is turning in one direction and having another end which anchors when the drum is turning in the other direction, a servo shoe engageable with the drum and movable in either direction with the drum to have an applying effect on the friction means in either direction of drum rotation, and applying means acting directly on the ends of the friction means and also simultaneously acting on the servo shoe.

2. A brake comprising, in combination, a drum, friction means having separable ends and arranged to anchor adjacent one of said ends when the drum is turning in one direction and adjacent the other of said ends when the drum is turning in the other direction, a servo shoe arranged between said ends and movable with the drum in either direction to have an applying effect on one or the other of said ends, and applying means acting directly on said ends and also acting on the servo shoe.

3. A brake comprising, in combination, a drum, friction means having separable ends and arranged to anchor adjacent one of said ends when the drum is turning in one direction and adjacent the other of said ends when the drum is turning in the other direction, a servo shoe movable with the drum in either direction to have an applying effect on one or the other of said ends, and applying means acting directly on said ends and also acting on the servo shoe.

4. A brake comprising, in combination, friction means, a floating servo shoe arranged to operate the friction means, and applying levers on the servo shoe and floating with the servo shoe and acting on the friction means by direct engagement therewith.

5. A brake comprising, in combination, shiftable anchorage friction means having separable ends, a servo shoe arranged to operate the friction means and applying means carried by the servo shoe and acting on the separable ends of the friction means and on the servo shoe.

6. A brake comprising, in combination, shiftable-anchorage friction means having separable ends, a servo shoe arranged to operate the friction means and operating levers acting directly on the separable ends to expand the friction means and to apply the servo shoe.

7. A brake comprising, in combination, a drum, friction means within the drum having separable ends, a servo shoe arranged between said ends, and a pair of operating levers fulcrumed on the servo shoe and acting on said ends in such a manner that the reactions on the fulcrums serve to urge the servo shoe against the drum.

8. A brake comprising, in combination, a drum, friction means expansible against the drum and having separable ends, a servo shoe arranged between said ends, a pair of levers, each of which is fulcrumed between its ends on the servo shoe and has its outer end in thrust engagement with one end of the friction means and the inner ends of which are adjacent each other, and applying means acting on the inner adjacent ends of said levers.

9. A brake comprising, in combination, a drum, friction means expansible against the drum and having separable ends, a servo shoe arranged between said ends, a pair of levers, each of which is fulcrumed between its ends on the servo shoe and has its outer end in thrust engagement with one end of the friction means and the inner ends of which are adjacent each other, and a cam acting on the inner adjacent ends of said levers.

10. A brake comprising, in combination, friction means having separable ends, a servo shoe between said ends, a pair of operating levers mounted on the servo shoe and a pair of return springs each of which is tensioned between one of said levers and one end of the friction means.

11. A brake comprising, in combination, friction means having separable ends, a servo shoe arranged between said ends, levers on the servo shoe cooperating with the friction means, an over running connection between the levers, and a pair of return springs tensioned between the servo shoe and said ends respectively.

12. A brake comprising, in combination, a drum, friction means within the drum having separable ends, a servo shoe between said ends, and an operating member having three arms linked respectively to the ends of the friction means and to the servo shoe.

13. A brake comprising, in combination, a drum, friction means within the drum having separable ends, a servo shoe arranged between said ends, a pair of eccentric thrust devices pivoted respectively on said ends and having wedging engagement with the servo shoe and an applying device acting on the thrust devices to force said ends apart and also acting to turn the thrust devices to wedge the servo shoe outwardly.

VINCENT BENDIX.
LUDGER E. LA BRIE.